(12) United States Patent
Reed et al.

(10) Patent No.: US 9,396,509 B1
(45) Date of Patent: Jul. 19, 2016

(54) CLOSED FORM NON-ITERATIVE WATERMARK EMBEDDING

(71) Applicant: Digimarc Corporation, Beaverton, OR (US)

(72) Inventors: Alastair M. Reed, Lake Oswego, OR (US); John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 82 days.

(21) Appl. No.: 13/664,165

(22) Filed: Oct. 30, 2012

Related U.S. Application Data

(60) Provisional application No. 61/553,226, filed on Oct. 30, 2011.

(51) Int. Cl.
    *G06T 1/00* (2006.01)
(52) U.S. Cl.
    CPC .................................. *G06T 1/0021* (2013.01)
(58) Field of Classification Search
    CPC . G06T 1/0021; G06T 1/0028; G06T 2200/28;
        G06T 1/0071; G06T 1/0035; G06T
        2201/0061; G06T 2201/0051; G06T 1/005;
        G06T 1/0064; G06T 2201/0052; H04N
        2201/3233; H04N 1/32144; H04L 2209/608;
        G06K 9/2063
    USPC ......................................... 382/100, 162, 232
    See application file for complete search history.

(56) References Cited

U.S. PATENT DOCUMENTS

| 5,394,483 | A | 2/1995 | Daly |
| 5,862,260 | A | 1/1999 | Rhoads |
| 5,905,819 | A | 5/1999 | Daly |
| 6,122,403 | A | 9/2000 | Rhoads |
| 6,345,104 | B1 | 2/2002 | Rhoads |
| 6,408,082 | B1 | 6/2002 | Rhoads et al. |
| 6,449,377 | B1 | 9/2002 | Rhoads |
| 6,559,975 | B1 | 5/2003 | Tolmer et al. |
| 6,590,996 | B1 * | 7/2003 | Reed ..................... G06T 1/0021 235/468 |
| 6,614,914 | B1 | 9/2003 | Rhoads et al. |

(Continued)

FOREIGN PATENT DOCUMENTS

WO    WO 2010140639 A1 * 12/2010

OTHER PUBLICATIONS

Assignee's U.S. Appl. No. 13/975,919, filed Aug. 26, 2013 (including Appendices A-C).
Scott J. Daly, "Visible differences predictor: an algorithm for the assessment of image fidelity", Proc. SPIE 1666, Human Vision, Visual Processing, and Digital Display III, 2 (Aug. 27, 1992).
Deshpande, et al. "A simplified method of predicting the colorimetry of spot color overprints," 18th Color Imaging Conference: Color Science and Engineering Systems, Technologies and Applications, p. 213-216, San Antonio, USA 2010.

(Continued)

*Primary Examiner* — Vu Le
*Assistant Examiner* — Kenny Cese
(74) *Attorney, Agent, or Firm* — Digimarc Corporation

(57) ABSTRACT

The present disclosure relates generally digital watermarking and data hiding. One claim recites: receiving data representing imagery; and then, using one or more processors: transforming the data into a multi-channel color space; determining an impact of adding a color channel watermark signal image to a color direction of the received data; determining a color space direction for watermark detection; determining weighting factors based on a determined impact; weighting the color channel watermark signal with signal embedding weighting factors to yield a modified color channel watermark signal; embedding the modified color channel watermark signal in the data representing imagery with consideration of the color direction. Of course, other claims and combination are provided as well.

10 Claims, 1 Drawing Sheet

(56) References Cited

U.S. PATENT DOCUMENTS

| | | |
|---|---|---|
| 6,631,198 B1 | 10/2003 | Hannigan et al. |
| 6,718,046 B2 | 4/2004 | Reed et al. |
| 6,721,439 B1 | 4/2004 | Levy et al. |
| 6,763,123 B2 | 7/2004 | Reed et al. |
| 6,763,124 B2 | 7/2004 | Alattar et al. |
| 6,891,959 B2 | 5/2005 | Reed et al. |
| 6,912,295 B2 | 6/2005 | Reed et al. |
| 6,947,571 B1 | 9/2005 | Rhoads et al. |
| 6,993,149 B2 | 1/2006 | Brunk et al. |
| 7,027,614 B2 | 4/2006 | Reed |
| 7,070,252 B2 | 7/2006 | DeQueiroz et al. |
| 7,352,878 B2 | 4/2008 | Reed et al. |
| 7,783,130 B2 | 8/2010 | Watson |
| 8,094,869 B2 | 1/2012 | Reed et al. |
| 8,199,969 B2 | 6/2012 | Reed |
| 8,310,718 B2 | 11/2012 | Chapman et al. |
| 9,179,033 B2 | 11/2015 | Reed et al. |
| 2005/0114667 A1 | 5/2005 | Haas |
| 2006/0165311 A1 | 7/2006 | Watson |
| 2010/0150396 A1* | 6/2010 | Reed .............. H04N 9/68 382/100 |
| 2010/0150434 A1 | 6/2010 | Reed |
| 2012/0014557 A1 | 1/2012 | Reed et al. |
| 2012/0128199 A1* | 5/2012 | Ono et al. ............. 382/100 |
| 2013/0329006 A1 | 12/2013 | Boles et al. |
| 2014/0119593 A1 | 5/2014 | Filler |
| 2015/0187039 A1 | 7/2015 | Reed et al. |

OTHER PUBLICATIONS

Fleet et al., "Embedding Invisible Information in Color Images," Proc. Int. Conf. on Image Processing, vol. 1, pp. 532-535, Oct. 1997.

Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.

R. Lyons et al, "Geometric enumerated chrominance watermark for spot colors," In Q. Lin, J.P. Alleback and Z. Fan, editors, Proceedings SPIE 8664, Imaging and Printing in a Web 2.0 World IV, vol. 8664, Mar. 2013.

Reed et al., "Full-color visibility model using CSF which varies spatially with local luminance." In Q. Lin, J. P. Allebach, and Z. Fan, editors, Proceedings SPIE 9027, Imaging and Multimedia Analytics in a Web and Mobile World 2014, vol. 9027, 2014.

Reed et al., "Watermarking Spot Colors in Packaging," Media Watermarking, Security and Forensics 2015, edited by Adnan M. Alattar, Nasir D. Memon, Chad D. Heitzenrater, Proc. of SPIE-IS&T vol. 9409, 940906.

Wyble et al., "A critical review of spectral models applied to binary color printing," Color Research & Application, 25(1):4-19, 2000.

X. Zhang et al., e.g., "A spatial extension of CIELAB for digital color image reproduction," in Proceedings of the Society of Information Display Symposium (SID'96), vol. 27, pp. 731-734, San Jose, Calif, USA, Jun. 1996.

* cited by examiner

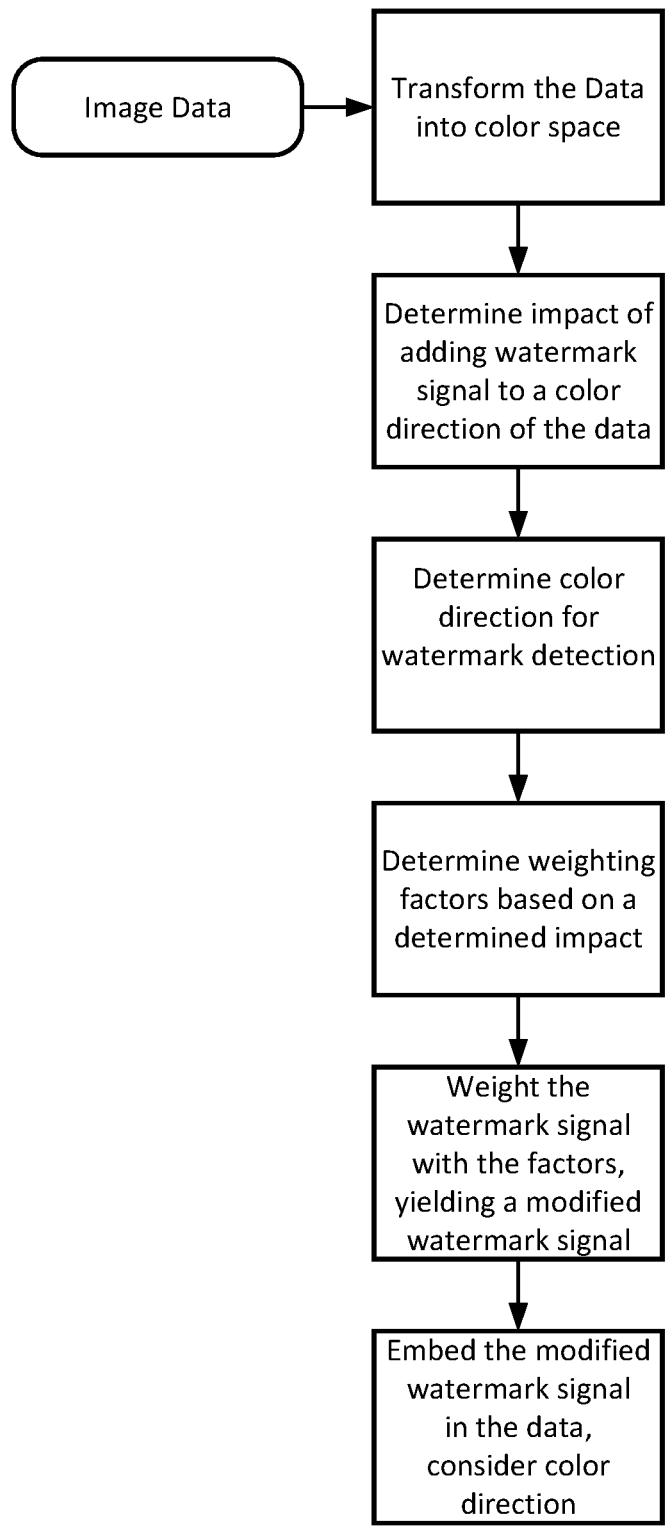

CLOSED FORM NON-ITERATIVE WATERMARK EMBEDDING

RELATED APPLICATION DATA

This application claims benefit of U.S. Provisional Application No. 61/553,226, filed Oct. 30, 2011.

This application is also related to U.S. patent application Ser. No. 12/634,505, filed Dec. 9, 2009 (published as US 2010-0150396 A1) and Ser. No. 12/337,029, filed Dec. 17, 2008 (published as US 2010-0150434 A1). Each of the above patent documents is hereby incorporated by reference in its entirety.

TECHNICAL FIELD

The present disclosure relates generally data hiding, digital watermarking and steganography.

BACKGROUND AND SUMMARY

The term "steganography" generally infers data hiding. One form of data hiding includes digital watermarking. Digital watermarking is a process for modifying media content to embedded a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process may then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding, digital watermarking and signal detection is reflected, e.g., in U.S. Pat. Nos. 7,072,487; 6,947,571; 6,912,295; 6,891,959; 6,763,123; 6,718,046; 6,614,914; 6,590,996; 6,522,769; 6,408,082; 6,122,403 and 5,862,260, and in published specifications WO 9953428 and WO 0007356 (corresponding to U.S. Pat. Nos. 6,449,377 and 6,345,104), and in published U.S. Patent Application No. US 2008-0298632 A1. Each of the patent documents mentioned in this paragraph is hereby incorporated by reference in its entirety. Of course, a great many other approaches are familiar to those skilled in the art. The artisan is presumed to be familiar with a full range of literature concerning steganography, data hiding and digital watermarking.

BRIEF DESCRIPTION OF THE DRAWINGS

FIG. 1 is a flow diagram corresponding to an image digital watermarking embedding method.

DETAILED DESCRIPTION

We have found ways to improve signal embedding. An exemplary use scenario operates on a color image or video including a signal encoded therein. One type of encoding encodes digital watermarking in a plurality of color channels. For example, the color image or video may be represented in the industry standard luminance and chrominance color space called "Lab" (for Lightness (or luminance), plus 'a' and 'b' color channels). Of course, the present disclosure will apply to and work with other color schemes and techniques as well. For example, alternative luminance and chrominance color schemes include "Yuv" (Y=luma, and 'u' and 'v' represent chrominance channels) and "Ycc" (also a dual chrominance space representation).

In a case where a media signal includes (or may be represented by) at least two chrominance channels, a watermark embedder may insert the same digital watermark signal in both the 'a' color direction and 'b' color direction. In one example the 'a' color direction represents a "blue/yellow" color direction, and the 'b' color direction represents a "red/green" color direction. This type embedding can be performed in parallel (if using two or more encoders) or serial (if using one encoder). The watermark embedder may vary the gain (or signal strength) of the watermark signal in the 'a' and 'b' channels to achieve improved hiding of the watermark signal. For example, the 'a' channel may have a watermark signal embedded with signal strength (or intensity) that is greater or less than the watermark signal in the 'b' channel. A Human Visual System response indicates that about twice the watermark signal strength can be embedded in the blue/yellow channel as the red green channel and still achieve favorable (e.g., equalized) visibility. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equation 2.

$$WMa = a(\text{channel}) + wm \quad (1)$$

$$WMb = b(\text{channel}) - wm \quad (2)$$

WMa is a watermarked 'a' channel, WMb is a watermarked 'b' channel, and wm represents a watermark signal. A watermarked color image or video (including L and WMb and WMa) can be provided, e.g., for printing, digital transfer or viewing. When printing this type of watermarking in newspaper print the watermark signal is mainly in yellow and magenta colors. Capture, e.g., with a cell phone, of such newspaper print utilizes at least the blue and green channels under white fluorescent lighting.

An encoded signal may include a message or payload having, e.g., a link to a remote computer resource, metadata or ownership information. The color image or video is rendered (e.g., printed, distributed or displayed). A user, e.g., equipped with a camera enabled cell phone, captures an image of an encoded color image or video with her cell phone camera. The captured image data is analyzed by a signal detector (embedded in the cell phone) to recover the message or payload. The present disclosure provides methods and apparatus to improve the detection of such encoded signals.

The following section discusses improving signal hiding including using contrast sensitivity function and non-iterative embedding.

Visibility Geometry

A contrast sensitivity function (CSF) that describes an impact of adding a single color channel watermark signal image, S, to a color direction of the original image, I, can be defined by, $$\Delta CSF_I = \left[ \left( \frac{(I+S) - (I+S)*b_o}{(I+S)*b_o} \right) - \left( \frac{I - I*b_o}{I*b_o} \right) \right] * HVS_I$$

Where

"*" represents convolution, $b_c$ represents the blurring kernel for contrast, and $HVS_I$ represents the HVS (human visual system) response kernel in the colorspace direction of I. Typically, the image, I, would be one of the three channels from the Lab colorspace representation where the HVS kernel corresponds to that channel. In other words, it is the difference in the contrast between the original and watermarked image filtered by the human visual response. Note that the equations always describe a value for each pixel in an image.

The signal can be designed to be near zero mean over the region size defined by the blurring kernel, $b_c$. Therefore, $S*b_c \cong 0$ and $$(I+S)*b_c = I*b_c + S*b_c \cong I*b_c$$

This allows the $\Delta CSF_I$ equation to be simplified to $$\Delta CSF_I \cong \left( \frac{S}{I*b_o} \right) * HVS_I$$

This is an intuitive result since the change in CSF is defined by the ratio of local distortion, i.e., watermark signal, to local image mean filtered by the HVS response.

The overall visibility impact, V, of the watermark signal on the full color image can then given by $$V^2 = \frac{\Delta CSF_L^2 + \Delta CSF_a^2 + \Delta CSF_b^2}{1 + w_L CSF_L^2 * b_m}$$

Where $w_L$ is the weighting for luminance contrast masking, $$CSF_L = \left( \frac{I - I*b_o}{I*b_o} \right) * HVS_L,$$

and $b_m$ is a luminance masking blurring kernel. We have chosen the above formula so that the geometry is expressed as an ellipsoid (e.g., a prolated ellipsoid like a squashed ball). Such an ellipsoid my may have a larger radius in the a-b plane and a shorter radius in the L direction due to the larger impact of L compared to a and b. The optimization result will be the same in any monotonic transform of visibility, V. However, the form of V simplifies the optimization.

To easy the discussion, there are no assumptions made about the original image other than that it can be transformed into the Lab colorspace format. The approach we describe applies to RGB, CMYK, and offset images where specific inks of arbitrary colors are used, among others.

The constant visibility surface in Lab colorspace can be viewed as an axis-aligned ellipsoid.

The luminance axis of the visibility ellipsoid is typically much smaller than the chrominance axes, a and b, due to the significantly increased sensitivity of the HVS to luminance changes over chrominance changes.

Signal Geometry

The constant signal surface can be defined by the detector operation. Assuming a watermark detector that is looking for a signal that is embedded in a single colorspace direction, e.g., gray or "a-b", the constant signal surface is a plane perpendicular to the signal direction. Due to the potential nonlinearity between the colorspace used by the detector and the Lab colorspace, the signal direction may be different for different regions of colorspace. For simplicity, we assume that any color transform nonlinearities are small enough so that within the normal watermark signal levels, the planar model of constant signal surface applies. More complex models that can be used to take local nonlinearities into account will not be discussed here.

Optimal Embedding Dominated by Visibility Constraints

If we ignore the constraints due to the color gamut, then the optimization problem can be simply to find the point on the desired constant visibility ellipsoid with the maximum signal projection. Or, stated differently, the point where the positive constant signal plane is tangent to the desired visibility ellipsoid. Note that the direction and magnitude of the maximum point is a direction and weight for the signal, not a specific signal value. This optimized signal weight is multiplied by the desired signal to find the specific color value at a given pixel.

To simplify the form of the equations, rename L, a, and b;

Let the equation of the plane as defined by the signal direction be $$p(L,a,b) = p_L L + p_a a + p_b b + p_d = 0$$

And the equation of the ellipsoid be $$e(L,a,b) = e_L L^2 + e_a a^2 + e_b b^2 = V^2$$

Then the tangent point in the positive signal direction is $$L = \frac{kp_L}{e_L}, a = \frac{kp_a}{e_a}, b = \frac{kp_b}{e_b}$$

Where $$k = \frac{V}{\sqrt{\frac{p_L^2}{e_L} + \frac{p_a^2}{e_a} + \frac{p_b^2}{e_b}}}$$

This leads to an embedding procedure as follows
1. Transform the original image into Lab colorspace using, e.g., ICC profiles (sets of data to represent image information) for improved accuracy.
2. Compute $\Delta CSF_L$, $\Delta CSF_a$, $\Delta CSF_b$, $1+w_L CSF_L^2 * b_m$ and the local detector signal colorspace direction.
3. Solve for L, a, and b signal embedding weights.
4. Add optimally weighted signal at each pixel after transforming weights to embedding colorspace Number 3, above, can be further simplified when the detector projection is known to be within the a-b plane. In that case, we look at the elliptic visibility disc in the a-b plane and the direction of the signal. The solution for a and b (L is assumed to be zero) is then an intersection of a line through origin and ellipse in the a-b plane. Of course, the intersection of any line with an ellipsoid is easily found: (1) write the parametric equation of the line (x=x0+at, y=y0+bt, z=z0+zt), (2) substitute parametric x, y, z expressions into the ellipsoid equation, and (3) solve for t.

FIG. 1 is a flow diagram corresponding to an image digital watermarking embedding method.

Color Gamut Geometry

The overall color gamut is defined by the span of each color in the original image color domain. However, we are primarily interested in the local gamut with respect to the level of watermark distortion that would reach the visibility limit. For most image regions, we would expect the visibility ellipsoid to be far from any gamut boundaries. When image regions are close to gamut boundaries then the visibility ellipsoid may extend beyond those boundaries. Once our visibility ellipsoid exceeds a gamut boundary, we actually encounter two boundaries which are symmetric about the average image color, e.g., the origin of the visibility ellipsoid.

The symmetric gamut is required because the watermark signal is zero mean and extends equally in the positive and negative directions. Therefore, embedding a signal in a direction away from the gamut boundary will also hit the gamut boundary at the same magnitude as a signal in the opposite direction.

The surface of a color gamut is locally modeled as a plane due to the small extent of the gamut surface for watermarking purposes. In general, the gamut surfaces are curved globally due to device characteristics such as color element saturation in screens or ink opacity in print devices. The global gamuts for a target device are preferably known for optimal watermarking.

In our approach, the planar models of local gamut are transformed into Lab colorspace. Due to the relatively small watermark distortions, the color gamut in a local watermark region is expected to be approximately planar in Lab even though the color transform to Lab may be globally nonlinear.

If the maximum signal point on the ellipse is outside the color gamut, then the color gamut planes intersect the ellipse and symmetrically "cut off" portions of the ellipse containing the maximum signal point. The constraint region defined by the color gamut is constructed with polygons and can be in the shape of a 3D volume (at least four unique colors where one color might be the background) or a 2D polygon (at least three unique colors including background), or a 1D line (at least two colors including background). Note that the 1D case is typically of an offset situation where a single ink is varied against a substrate to achieve a color range. In all cases, the region formed between the surfaces of local gamut and visibility constraints represent all of the allowable embedding weights. The optimal embedding weights are determined by the point on the constraint region that has the largest signal projection.

Optimal Embedding Dominated by Gamut Constraints

If we are not willing to modify the average local color, then we can search the corners of the gamut region to find the optimal embedding weights which will result in lower visibility. Since the constant signal surface is planar, the point where it first meets the gamut region will always be on a corner (or two corners with equal signal projections). If a gamut region corner exceeds the desired visibility, they can be discarded, otherwise, they can be compared to any intersections between the visibility ellipsoid and the gamut faces or edges.

Optimal Embedding for Intersections Between Visibility Gamut Constraints

A more involved case can be where there are intersections between the visibility and gamut constraints that can be examined. These intersections can be in the form of two points if the gamut is a line, and one or more ellipses when the gamut is a plane or volume. There are also cases for current embedding methods where reasonable approximations can greatly simplify the intersection computations.

Chrominance Embedding

Chrominance embedding can avoid changes to the luminance channel to minimize visibility. For this type of embedding, the signal direction is in the a-b plane which means that if the maximum signal projection is not on the ellipsoid and is not a gamut corner, it may lie on the slice through the visibility ellipsoid that lies on the a-b plane, i.e., an ellipse. Therefore, we can evaluate the intersection between the a-b visibility ellipse and each of the gamut planes to find possible optimal embedding points.

We can then enumerate the pairs of points for each intersection pair and test them for gamut limits. We then compare the signal projections of the intersection points with any valid gamut corner points to choose the valid candidate with the largest signal projection.

Gray Embedding

Gray embedding is color agnostic and combines R, G, and B in equal parts for signal detection. As such, the intersection between a gamut limit plane and the visibility ellipsoid will be an ellipse somewhere on the surface of the ellipsoid. We would then find the point on each intersection ellipse that has the largest projection onto the signal and compare them.

Removing the Gamut Constraints

The solution posed above relies on an exhaustive search for the maximum point on a visibility ellipsoid truncated by gamut planes. Although the search over the truncated ellipse is straightforward, a simpler approach may to reshape the colorspace such that the gamut planes no longer intersect with the visibility ellipse. Then the solution reverts to the maximum signal projection on the ellipsoid. Ideally, the colorspace would be distorted in way that not only moves the gamut planes to the surface of the ellipsoid, but also minimizes any perceptual difference between the original and distorted images. The problem of reducing gamut limits with minimum perceptual impact has been encountered in many situations and has been well researched. Fortunately, for the embedding problem posed above, we can accurately determine the specific gamut limits that affect the embedding process as well as the distance in colorspace that the gamut limits are moved to achieve the given visibility constraint.

The computing environments used to implement the above processes and system components encompass a broad range from general purpose, programmable computing devices to specialized circuitry, and devices including a combination of both. The processes and system components may be implemented as instructions for computing devices, including general purpose processor instructions for a variety of programmable processors, including microprocessors, Digital Signal Processors (DSPs), etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processors and/or made parallel across processors within a device or across a network of devices. Transformation of content signal data may also be distributed among different processor and memory devices.

The computing devices used for signal detection and embedding may include, e.g., one or more processors, one or more memories (including computer readable media), input devices, output devices, and communication among these components (in some cases referred to as a bus). For software/firmware, instructions are read from computer readable media, such as optical, electronic or magnetic storage media via a communication bus, interface circuit or network and executed on one or more processors.

The above processing of content signals may include transforming of these signals in various physical forms. Images and video (forms of electromagnetic waves traveling through physical space and depicting physical objects) may be captured from physical objects using cameras or other capture equipment, or be generated by a computing device. While these signals are typically processed in electronic and digital form to implement the components and processes described above, they may also be captured, processed, transferred and stored in other physical forms, including electronic, optical, magnetic and electromagnetic wave forms. The content signals can be transformed during processing to compute signatures, including various data structure representations of the signatures as explained above. In turn, the data structure signals in memory can be transformed for manipulation during searching, sorting, reading, writing and retrieval. The signals can be also transformed for capture, transfer, storage, and output via a display or audio transducer (e.g., speakers).

It will be recognized that this technology finds utility with all manner of devices—both portable and fixed. PDAs, organizers, portable music players, desktop computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones.

(Details of the iPhone, including its touch interface, are provided in published patent application 20080174570.)

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc). The processor can be a special purpose electronic hardware device, or may be implemented by a programmable electronic device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more electronic digital signal processing cores, such as Texas Instruments TMS320 series devices.

Software instructions for implementing the detailed functionality can be readily authored by artisans, from the descriptions provided herein, conclusions, and other determinations noted above.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.)

In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.)

CONCLUDING REMARKS

Having described and illustrated the principles of the technology with reference to specific implementations, it will be recognized that the technology can be implemented in many other, different, forms. To provide a comprehensive disclosure without unduly lengthening the specification, each of the above referenced patent documents is hereby incorporated by reference in its entirety.

The particular combinations of elements and features in the above-detailed embodiments are exemplary only; the interchanging and substitution of these teachings with other teachings in this and the incorporated-by-reference patent documents are also contemplated.

What is claimed is:

1. A method comprising:
   obtaining data representing imagery; and then,
   using one or more processors:
   transforming the data representing imagery into a multi-channel color space;
   determining an impact of adding a color channel watermark signal to a color direction of the data representing imagery, in which said determining utilizes a relationship of local distortion introduced by the color channel watermark signal to local image data in the data representing imagery, processed by a Human Visual System (HVS) response;
   determining a color direction for watermark detection;
   determining weighting factors based on a determined impact;
   weighting the color channel watermark signal with determined signal embedding weighting factors to yield a modified color channel watermark signal;
   embedding the modified color channel watermark signal in the data representing imagery with consideration of a determined color direction.

2. The method of claim 1 in which one or more processors are programmed to carry out the method of claim 1.

3. The method of claim 1 in which said embedding comprises altering data representing each pixel of the data representing imagery.

4. The method of claim 1 in which said embedding proceeds after transforming signal embedding weights to an embedding color space.

5. A non-transitory computer readable medium comprising instructions stored thereon to cause a programmed computer to perform the method of claim 1.

6. The method of claim 1 further comprising: modeling a constant visibility surface in Lab color space as an axis-aligned ellipsoid.

7. A system comprising:
   electronic memory for storing data representing imagery;
   one or more electronic processors configured for transforming the data representing imagery into a multi-channel color space;
   means for quantifying an impact of adding a color channel watermark signal to a color direction of the of the data representing imagery, in which said determining utilizes a relationship of local distortion introduced by the color channel watermark signal to local image data in the data representing imagery, processed by a Human Visual System (HVS) response;
   means for determining a color direction for watermark detection;
   means for quantifying weighting factors based on a determined impact;
   means for weighting the color channel watermark signal with determined signal embedding weighting factors to yield a modified color channel watermark signal; and
   one or more electronic processors configured for embedding the modified color channel watermark signal in the data representing imagery with consideration of a determined color direction.

8. The system of claim 7 in which said one or more electronic processors configured for embedding are configured for altering data representing each pixel of the data representing imagery.

9. The system of claim 7 in which said one or more electronic processors configured for embedding proceeds with embedding after transforming signal embedding weights to an embedding color space.

10. The system of claim 7 further comprising: means for generating a constant visibility surface in Lab color space represented as an axis-aligned ellipsoid.

* * * * *